Figure 4:
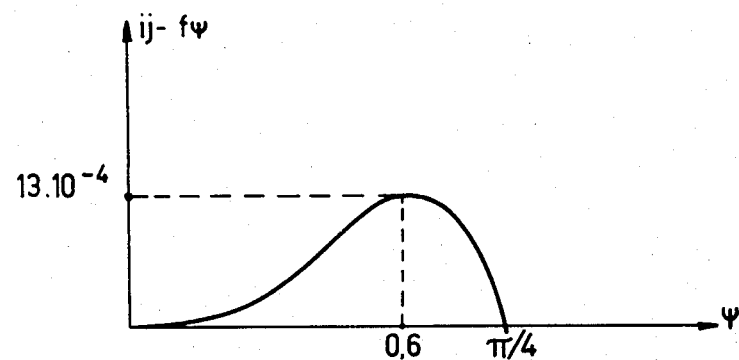

United States

Hunzinger

[11] 3,764,198

[45] Oct. 9, 1973

[54] OBJECTIVE SYSTEM CONSISTING OF A DIAPHRAGM AND A SINGLE LENS

[75] Inventor: Jean-Jacques Hunzinger, Paris, France

[73] Assignee: U.S. Phillips Corporation, New York, N.Y.

[22] Filed: June 1, 1972

[21] Appl. No.: 258,487

[30] Foreign Application Priority Data

June 7, 1971 France ............................. 7120408

[52] U.S. Cl. ............................. 350/190, 350/206
[51] Int. Cl. ............................. G02b 3/06
[58] Field of Search ............... 350/190, 206, 233, 350/175 R, 181

[56] References Cited
UNITED STATES PATENTS 1,713,708  5/1929  Merte ......................... 350/206 X
2,738,700  3/1956  Taylor ......................... 350/206
3,039,360  6/1962  Hopkins ...................... 350/206

FOREIGN PATENTS OR APPLICATIONS 29,478  7/1964  Germany ........................ 350/190

*Primary Examiner*—John K. Corbin
*Attorney*—Frank R. Trifari

[57] ABSTRACT

An objective system which comprises, in order of succession, a diaphragm and a single lens is described. It is shown that if such an objective satisfies several requirements, the "condition of radial distortion" applies to this objective, i.e., there is a linear relationship between an angle of incidence of a beam of radiation on the objective and the associated point in the image plane.

2 Claims, 7 Drawing Figures

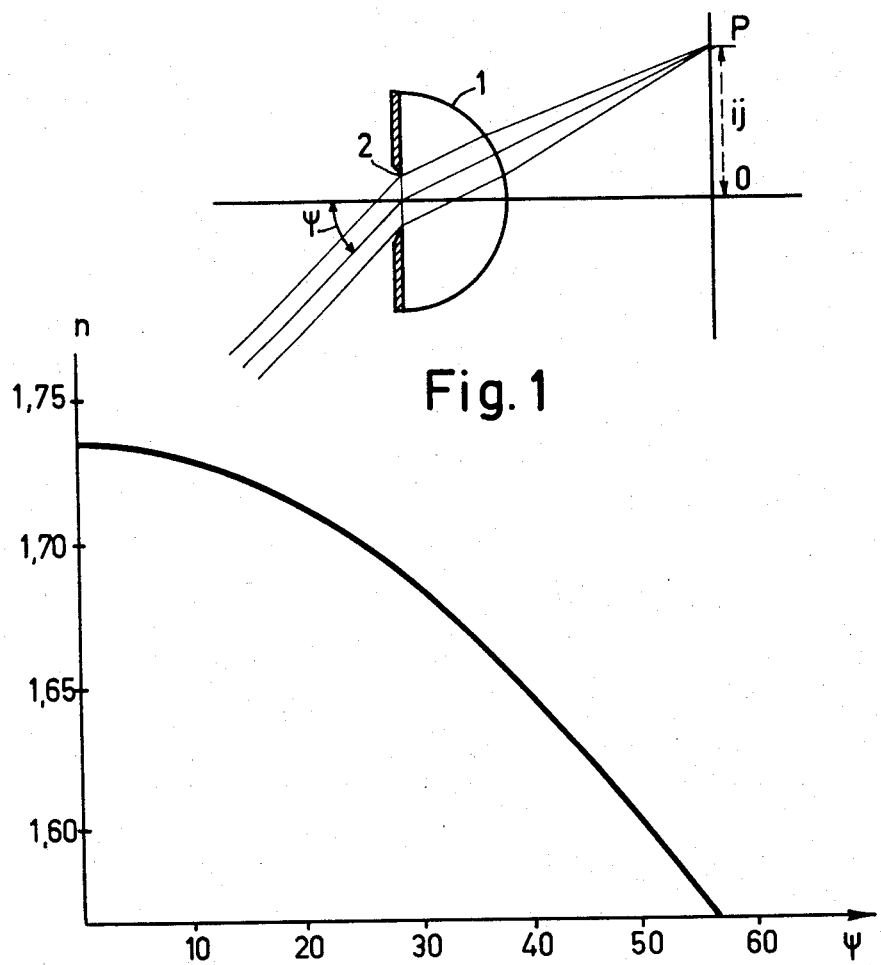
Fig. 1
Fig. 2
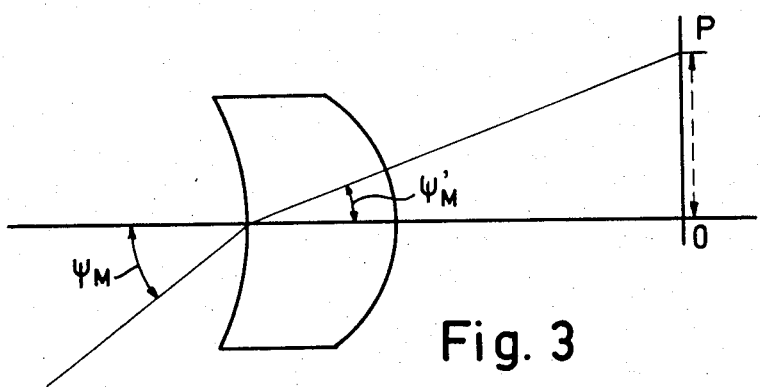
Fig. 3

OBJECTIVE SYSTEM CONSISTING OF A DIAPHRAGM AND A SINGLE LENS

The invention relates to an objective system which comprises in order of succession a diaphragm and a single lens. Such an objective system may be used for determining directions, the measurement of the angles being converted into a measurement of displacement.

Goniometric problems are frequently met with, in particular in determining the position of an object and especially in checking the attitude of a satellite which is to be oriented with respect to a heavenly body. In this case the angles between the direction of the heavenly body and the axes of the satellite are to be measured. The orienting system is generally referred to as a sun or star sensor.

In a comparatively elementary embodiment such a sensor generally comprises a plurality of radiation-sensitive detectors arranged in a plane according to a regular pattern. These detectors are so placed behind a screen that their plane is parallel to the plane of the screen. The screen has a hole formed in it which lies on the normal to the detector plane through the center of the detector pattern. A source of light which emits radiation at an angle $\psi$ to the normal to the plane of the screen and at an aximuth angle $\theta$ with respect to co-ordinate axes $x, y$ in the plane of the screen, illuminates a given element of the detector pattern having co-ordinates $x, y$.

If the relation between $\psi$, $\theta$ and $x, y$ is known, the direction in which the source is observed, hereinafter referred to as the source direction, relative to the satellite can be determined.

In actual fact the problem becomes more complicated when the light source at infinity has an apparent non-negligible dimension, as is the case, for example, with the sun observed from the earth. In this case, the luminous spot on the plane of the detectors has a brightly illuminated part, which hereinafter will be referred to as "full light" part, and a less brightly illuminated part, which hereinafter will be referred to as the "penumbra" part. The "full light" and "penumbra" areas may vary with the direction of the source relative to the plane of the screen and the detector plane.

The variations of these areas are sources of inaccuracy in measuring $\theta$ and $\psi$. To improve the accuracy of the measuring system these surface variations should have to be allowed for in arranging the detectors in the detector plane. In actual fact in most of the known devices, for example that described in French Patent Specification Nr. 1,564,627, the diaphragm used has the form of a slit having substantially parallel edges, and the angle $\psi$ is to be measured between the normal to the slit at its center, or optical axis, and the direction of the source, when this direction is in a plane at right angles to the slit. The apparent image of the source in the detector plane then is a stripe of light which is parallel to the slit and is divided into a central full-light stripe and to penumbra stripes situated one on either side of the full-light stripe, these stripes having areas which depend upon $\psi$. The deviation $y$ of the center of the apparent image of the source relative to the optical axis in the detector plane is $$y = D \tan \psi \qquad (1)$$

where $D$ is the distance between the detector plane and the diaphragm slit, while the width of the stripe, inclusive of the penumbra, is $$1 = a + \alpha\, D/\cos^2\psi \qquad (2)$$

where $a$ and $\alpha$ are the width of the slit and the apparent diameter of the light source at infinity respectively.

A first improvement of this device is described in French Patent Specification No. 1,564,627. In the device described in this specification there is inserted in the path of the radiation behind the slit a cylindrical lens, the generatrices of which are parallel to the slit, in the form of an objective lens to concentrate the light on to the detectors. Such an objective lens serves to eliminate the penumbra in the apparent image. However, this objective lens exhibits field curvature; hence no correct focussing is obtainable for all the points of the field simultaneously.

On the other hand, such an objective lens which is free from distortion in the usual meaning of the word still complies with the relationship (1). Hence the width $dy$ of the stripe of light on the detector plane which corresponds to an object viewed at a constant solid angle $d\psi$, is a function of the angle $\psi$, which causes the accuracy of measuring $d\psi$ to vary with $\psi$. This would not be the case if the objective lens should exhibit a radial distortion $$y = K\psi$$

where $K$ is a constant.

The width $dy$ of the luminous stripe of the image of a source at infinity of apparent diameter then would be:

$$dy = K\, d\psi = K\alpha$$

independent of $\psi$.

Such a distortion condition is satisfied by a combination of thin lenses which are separated in air by distances which are not negligible with respect to the focal distance. This solution is complicated and requires accurate assembly and adjustment. The resulting objective is difficult to manufacture, comparatively bulky and heavy. Hence a composite objective cannot readily be used in several fields, in particular in space technology.

The objective according to the invention enables these difficulties to be avoided. It is small and comprises a single thick lens which is comparatively robust and need not be mounted in a highly special manner while satisfying the radial condition in the focal plane. This objective lens enables the width of the apparent image of a source of light at infinity to be rendered independent of the source direction. This facilitates the arrangement of the detectors in the focal plane of the lens and provides a linear relationship between the measurement of angles and of distances.

The objective system according to the invention is characterized in that the surface of incidence is diverging and the surface of emergence is converging, in that the distance, measured along the optical axis, between the diaphragm and the surface of incidence is at most equal to 1/5 of the lens thickness $e$, also measured along the optical axis, in that the index of refraction of the lens material has a value between 1.54 and 1.73, and in that the radii of curvature $r_1$ and $r_2$ of the surface of incidence and emergence respectively are related to one another and to the lens thickness $e$ according to the following expression:

$$r_2/r_1 = e/r_1 = 0.28 \pm 0.06.$$

Figure 5:
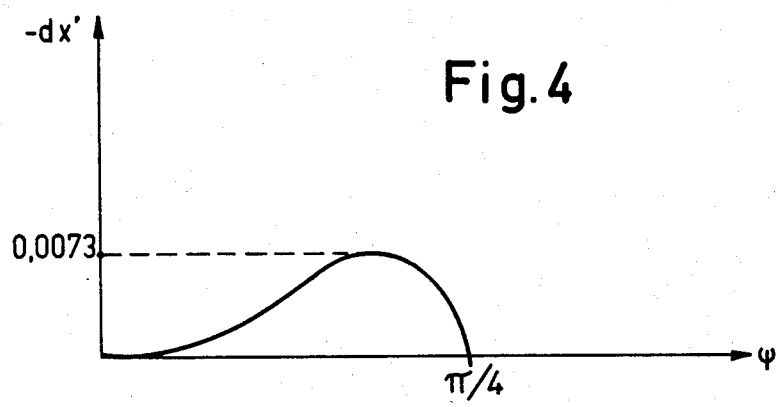
Figure 7:
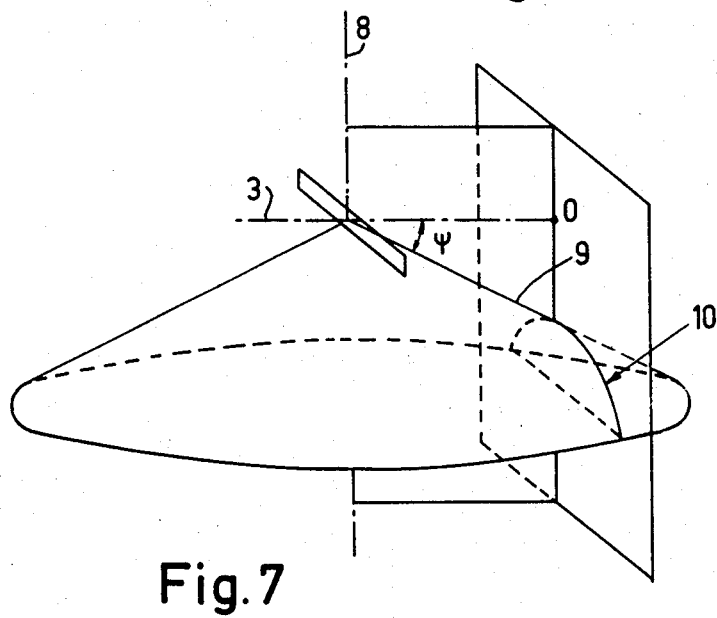
Figure 6:
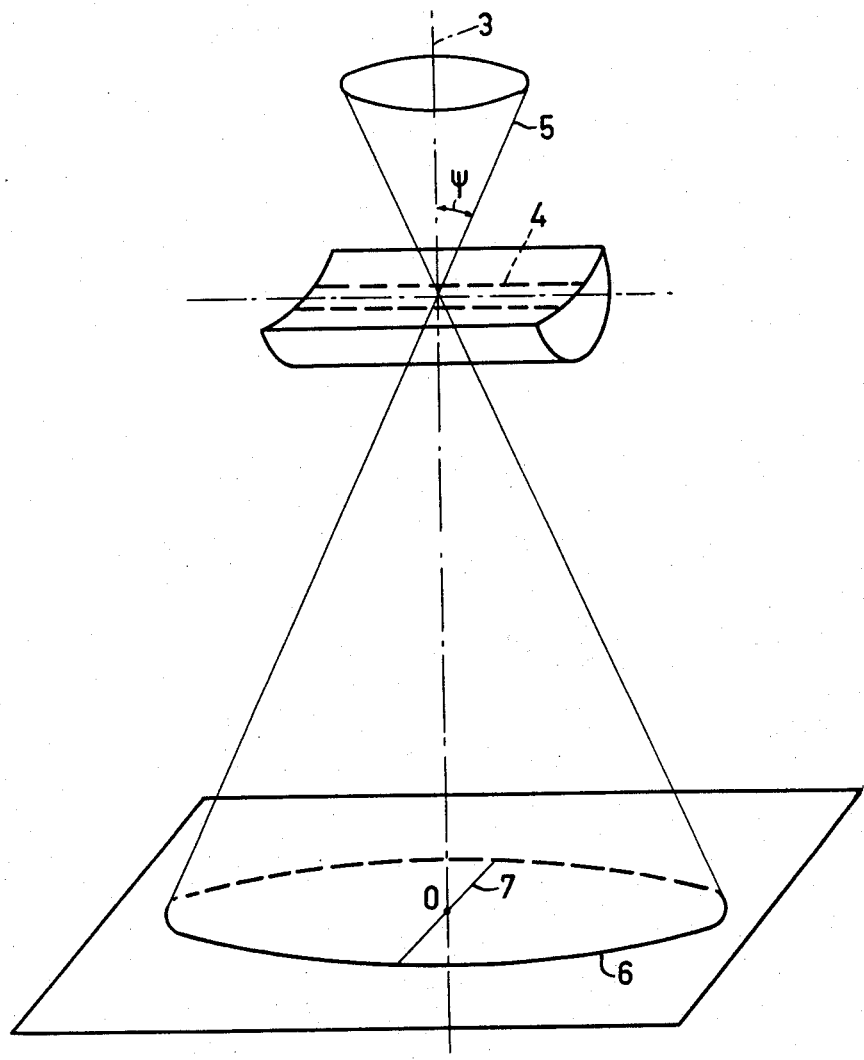

The invention will be described, by way of example with reference to a cylindrical lens. Reference is made to the accompanying drawings in which:

FIG. 1 is a cross-sectional view of a semicylindrical lens and shows the ray path through its lens, FIG. 2 shows the desired variation of the index of refraction $n$ as a function of the direction of the source, FIG. 3 is a cross-sectional view of a lens according to the invention and shows the ray path through this lens, FIGS. 4 and 5 illustrate the deviations from the ideal case which are introduced by the lens of FIG. 3, FIG. 6 shows the use of a lens according to the invention in a sensor in which the axis of rotation of the sensor coincides with that of the lens, and FIG. 7 shows the use of a lens according to the invention in a sensor the rotation axis of which is at right angles to that of the lens.

According to a first aspect of the invention a single lens is designed which satisfies the radial distortion condition in the paraxial focal plane.

Such a lens may take the form of a semi-cylindrical lens which is provided with a diaphragm in the form of a slit which extends parallel to the axis of the cylinder.

FIG. 1 is a cross-sectional view of such a lens which is designated 1, while the slit is designated by 2. P is the apparent image of a source at infinity. The beam of radiation from this source is at an angle $\psi$ to the optical axis of the lens. 0 is the paraxial focus, and $y$ is the distance between P and 0.

At given values of the index of refraction $n$ the radial condition $y = f\psi$, where $f$ is the paraxial focal distance, is satisfied to a good approximation.

Denoting the radius of the cylindrical lens by R, the series of development of $y$ as a function of $\psi$ is $$y = R/n-1 \ [\psi + (1/2n^2 - 1/6) \ \psi^3 + \ldots ] = f \ ]\psi + (1/2n^2 - 1/6) \ \psi^2 + \ldots ]$$

If $n = \sqrt{3}$, the term containing $\psi^3$ is equal to zero, so that the radial condition is satisfied up to the fifth order. However, the deviation from this linearity increases with $\psi$.

This effect may be corrected by choosing $n$ to be such that the radial condition is fully satisfied for one half of the maximum field angle $\psi_M$.

The curve of FIG. 2 shows the values of $n$ as a function of one half of the field angle $\psi_M$ at which the radial condition is satisfied. The values of $n$ lie between 1.73 and 1.54 at half field angles between 0° and 60°. These values of n are suitable only if the third-order term in $\psi$ remains small in the series expansion of $y$.

For example, with $n = 1.54$, which corresponds to a half field angle of 60°, the coefficient of the term containing $\psi^3$ of the series expansion of $y$ is 0.045, which is a small value compared with the value of 1/3 in the development of $y = f \tan \psi$. On the other hand, this coefficient decreases with increase of $n$. Thus it can be said that the radial condition is reasonably satisfied with $1.54 < n < 1.73$.

Glasses having this value of $n$ are known. Glass having an index of refraction $n = \sqrt{3}$ is dispersive or fragile. Such a glass may be used, however, as an alternative the desired value of the index of refraction may be decreased by from 0.10 to 0.15. This permits the use of glasses which are more generally used, are less expensive and in particular less dispersive. This is of particular importance when the desired accuracy is very high, with the consequent necessity of achromatisation.

Such a lens, which is provided with a slit, has a very small spherical aberration, because the aperture of, for example, $f/12$ is small. Still it provides an illumination in the image plane which is 10 times that of the source viewed through the slit without the aid of the lens. On the other hand, owing to the position of the diaphragm the coma is equal to zero, although the Abbe condition is not satisfied.

However, there are aberrations present which are due to field curvature. This may be provided for according to a secound aspect of the invention. These aberrations are the tangential and sagittal image formation in the cross-sectional plane of the lens. In actual fact the sagittal power of the cylindrical lens is equal to zero and hence the tangential field curvature only is to be considered. This is equal to the Petzval curvature of the system.

To reduce this curvature and to render the field plane, according to the invention the power of the lens components may be adapted while retaining the successive refractions of the principal ray. The plane incidence surface is replaced by a concave cylindrical surface, the slit being located at the top of this surface. In addition the thickness $e$ of the lens measured along the axis and the radius of curvature of the emergence surface are modified but maintained equal to one another, as is shown in FIG. 3.

A correction of the tangential field curvature is obtained if the tangential focal distance associated with the maximum field half angle $\psi_M$ lies in the paraxial focal plane.

The following values were used in a practical embodiment of a lens according to the invention: maximum field half angle $\psi_M = 45°$, corresponding index of refraction $n = 1.6247$; this index of refraction is that of a known crown glass. The dimensions of the lens are:

$r_1 = -1$
$e = 0.2728147$
$r_2 = 0.2728147$
focal distance $f = 0.5291314$.

The distance $x'_2$ between the surface of the emergence and the focal plane of this objective lens is equal to 0.5843786.

The distance between the image and the optical axis for the field half angle $\psi_M = 45°$ is $$y \ (45°) = 0.4158584 \ \text{(calculated trigonometrically)}$$

whilst the radial function has the value $$f \cdot \psi_M = 0.4155786,$$

so that for this field angle there is a deviation from the radial condition $$y \ (45°) - f\psi_M = + 0.0002798;$$

in all these expressions the radius of curvature of the incidence surface is used as a unit.

The curves of FIGS. 4 and 5 refer to this numerical example and show the values $y - f\psi$ and the deviation $dx'$ of the adjustment owing to the residual tangential field curvature respectively as functions of the angle $\psi$ $(0 < \psi < \psi_M)$.

Hitherto it has been assumed that the diaphragm is located on the surface of incidence. However, calculations show that removal of this diaphragm from the surface of incidence produces only a very slight change in the deviations from the radial condition and the condition for correction of the field curvature, if the distance between the diaphragm and the surface of incidence does not exceed 20 percent of the thickness of the lens.

According to the invention such a lens is included in a sun sensor having a rotating slit. FIG. 6 shows a first embodiment of such a device for determining the attitude of a satellite. In this device the optical axis 3 of the lens, which is provided with a slit 4, coincides with the axis of rotation of the sensor.

The sun lies on a cone of revolution 5 about the axis 3 having a half apical angle $\psi$.

The principal ray traces a curve 6 substantially equal to an ellipse in the image plane. One half of the minor axis 7 of the ellipse is equal to the product $f\psi$, the distance $f\psi$ between the image of the sun and the center 0 being attained at the instant at which the sun passes through the transverse plane passing through the centre of the cylindrical lens. At this instant the image of the sun is in focus in the paraxial focal plane.

When the sun passes through the said transverse plane, the angle $\psi$ is accurately detemined by measuring a distance $f\psi$ by means of detectors which are regularly arranged according to the minor axis 7 of the ellipse 6.

In another embodiment of a direction sensor according to the invention the optical axis 3 of the provided lens with a diaphragm extends at right angles to the axis of revolution 8 of the sensor, as is shown in FIG. 7.

The projection of the trajectory of the sun, the cone of revolution 9, on to the image plane is a hyperbola 10. The distance of this hyperbola from the optical axis, or apparent image of the sun, passes through a minimum during a complete revolution. This minimum distance is $f\psi$, where $\psi$ obviously is the angle between the optical axis and the direction of the sun at the instant at which the sun passes through the transverse plane containing the center of the cylindrical lens and for which the apparent image is completely in focus.

The invention is not restricted to an objective system comprising a cylindrical lens, but may also be applied to an objective comprising a thick lens having spherical surfaces of incidence and emergence In the latter case the index of reflection must lie between the same limits as in the case of a cylindrical lens, and the radii of curvature of the spherical surfaces are in the same ratio to the axial thickness of the lens as in the cylindrical lens. The diaphragm arranged in front of the surface of incidence then has a circular aperture.

What is claimed is:

1. Objective system which consists of in order of succession a diaphragm and a single lens, characterized in that the surface of incidence of the lens is diverging and its surface of emergence is converging, in that the distance, measured along the optical axis, between the diaphragm and the surface of incidence is at most equal to 1/5 of the lens thickness $e$, also measured along the optical axis, in that the index of refraction of the lens material has a value between 1.54 and 1.73, and in that the radii of curvature $r_1$ and $r_2$ of the surfaces of incidence and emergence respectively are related to one another and to the lens thickness $e$ according to the following expression:

$$r_2/r_1 = e/r_1 = 0.28 \pm 0.06$$

2. Objective system as claimed in claim 1, characterized in that the surfaces of incidence and emergence of the lens are surfaces of cylinders having parallel generatrices and a common plane of symmetry, the edges of the diaphragm being parallel to the generatrices of the lens.

* * * * *